US 6,720,512 B1

(12) United States Patent
Rothbauer et al.

(10) Patent No.: US 6,720,512 B1
(45) Date of Patent: Apr. 13, 2004

(54) SURFACE MOUNT SWITCH PLATE (76) Inventors: Dan Rothbauer, 4703 Wyland Dr., Elkhart, IN (US) 46516; Brian Rothbauer, 4703 Wyland Ave., Elkhart, IN (US) 46516

( * ) Notice: Subject to any disclaimer, the term of this patent is extended or adjusted under 35 U.S.C. 154(b) by 0 days.

(21) Appl. No.: 10/395,917

(22) Filed: Mar. 24, 2003

(51) Int. Cl.$^7$ .................................................. H01H 3/02
(52) U.S. Cl. ......................... 200/330; 174/66; 200/296; 200/333; 200/339
(58) Field of Search ................................. 200/294–296, 200/330, 333, 339, 311–316; 174/66, 67

(56) References Cited

U.S. PATENT DOCUMENTS

| | | | | |
|---|---|---|---|---|
| 2,571,837 A | * | 10/1951 | Coles | 200/330 |
| 3,571,548 A | * | 3/1971 | Osika | 200/295 |
| 4,128,745 A | * | 12/1978 | Marsilio et al. | 200/300 X |
| 4,972,045 A | * | 11/1990 | Primeau | 174/66 |
| 5,806,665 A | * | 9/1998 | Houssian | 200/330 |
| 6,255,610 B1 | * | 7/2001 | Botz et al. | 200/315 |
| 6,274,831 B1 | * | 8/2001 | Kim et al. | 200/296 |

* cited by examiner

*Primary Examiner*—James R. Scott
(74) *Attorney, Agent, or Firm*—Frank A. Lukasik (57) ABSTRACT

A surface mounted switchplate having a removable toggle cover for use as an auxiliary switching device with a prior art toggle switch unit. The invention completely encloses the terminal set while providing an auxiliary moveable cover mounted on pivot shafts, which when rocked back and forth, acts upon the toggle switch to open and close the electrical circuit. A second embodiment contains a clear button formed in the cover to allow light from an illuminated rocker switch to shine therethrough.

3 Claims, 10 Drawing Sheets

SURFACE MOUNT SWITCH PLATE

BACKGROUND OF THE INVENTION

The present invention relates to switchplates and switch covers and, more particularly, to a surface mounted switchplate having a removable toggle cover for use as an auxiliary switching means with a prior art toggle switch unit.

Prior art toggle switches are normally mounted to surfaces into which the terminal block of the switch can be embedded or countersunk leaving the toggle portion exposed for switch operation. Generally, there is no difficulty in mounting such a switch providing there is sufficient depth or thickness of substrate beneath the mounting surface. Cabinetry and normal residential walls provide sufficient depth or thickness to facilitate the mounting of a switch in a suitable aperture below the surface. This is not the case in some recreational vehicles or some marine applications where wall thicknesses are often measured at less than ½ Where walls are thin, it is impossible to cut an aperture large enough to accommodate the pendant terminal portion without cutting a hole completely through the wall.

In the recreational vehicle industry, wiring and switching can often be concealed beneath or within wall surfaces but such mounting is restricted to thicker areas such as the dashboard fascia. The present invention provides a simple surface mounted switch using regular prior art toggles and which does not require wall or surface thickness into which to recess the terminal block.

The invention provides a receptacle into which a toggle switch such as one disclosed in U.S. Pat. No. 4,128,745 issued to Marsilio and O'Bryan Dec. 5$^{th}$ 1978 is inserted. Such toggle switches have an upper side movable switch and a lower side pendulous terminal set. The present invention completely encloses the terminal set while providing an auxiliary moveable cover mounted on pivot shafts which, when rocked back and forth acts upon the toggle switch to open and close the electrical circuit.

Provision of the oscillating cover allows for more convenient switching than does the toggle switch alone because it provides a larger surface for the hand to find in the dark, for example, and makes switching possible by simply brushing the hand over the cover instead of having to search for a small toggle switch to activate with the fingers.

The main body of the invention switch plate is attached directly upon the wall surface providing thereby an attachment means into which the toggle switch is inserted. The invention further provides an aperture of such dimension as to exactly accommodate a plurality of flexible molded plastic protrusions on each side of the toggle switch. These protrusions are designed to flex inwardly as the toggle switch is inserted into the switchplate body and to thereafter regain enough of their original shape to provide an interference with the inner walls of the baseplate aperture and to thereby secure the toggle in place. This process provides a simple and secure means for attaching the toggle to the baseplate. Assembly of the unit is completed by snapping the cover portion of the baseplate, over the toggle switch. The cover is provided with a pair of semicircular notches placed on opposite sides of the cover to provide a female portion of a pivot means, the baseplate itself provides a pair of semi circular male mounts of similar diameter to the holes in the cover plate. When the cover is offered up to the baseplate, the male and female portions of the pivot means become removeably attached and provide thereby the desired rocking motion necessary to activate the toggle switch beneath.

Having in mind the foregoing, it is a principle object of the present invention to provide a surface mounting means for a toggle switch that will allow the toggle switch to be safely and securely mounted on a wall.

It is a further and important object of the invention to make the entire unit simple to assemble/disassemble and yet provide suitable and reasonable protection against tampering or accidental exposure to electrical components.

It is a further object of the invention to provide a larger, more convenient switch for access by the physically disadvantaged or for easier access in diminished light.

It is a further object of the invention to provide a baseplate which can accommodate multiple toggle switches and circuits and to provide same in a variety of popular colors and sizes.

It is a further object of the invention to provide a baseplate which can be mounted without marring the wall and which is raised to allow room in the wall for termination.

It is a further object of the invention to accommodate a variety of toggle switches of different style, shape and capacity.

Other objects and advantages of the present invention will appear more fully hereinafter it being understood that the invention consists in the combination, construction, location and relative arrangements of parts, all as described in the following specification, as shown in the accompanying drawings and as finally described in the appended claims.

BRIEF DESCRIPTION OF THE DRAWINGS

FIGS. 9–10$b$ are various plan and elevational views of the invention in some of its forms as a multiple switching unit.

BRIEF DESCRIPTION OF THE PREFERRED EMBODIMENT

Figure 1:
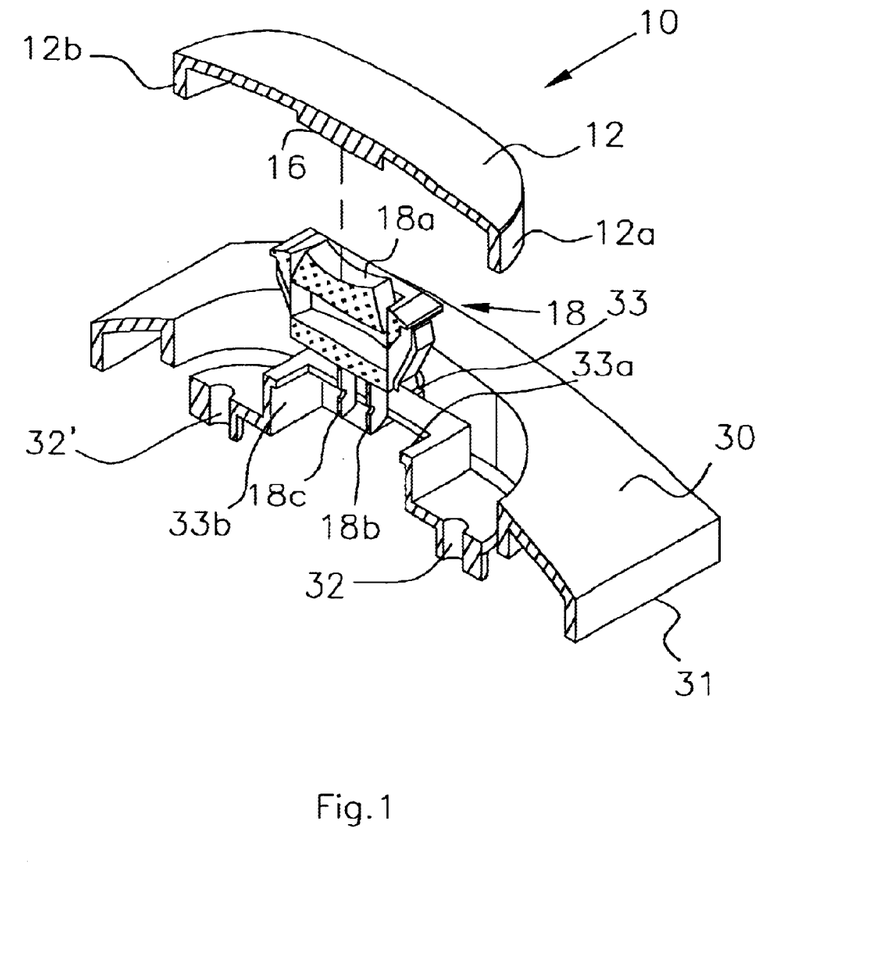
FIG. 1 is an exploded perspective view, partially in section showing the baseplate and cover constructed in accordance with and embodying the principles of the present invention.
Figure 2:
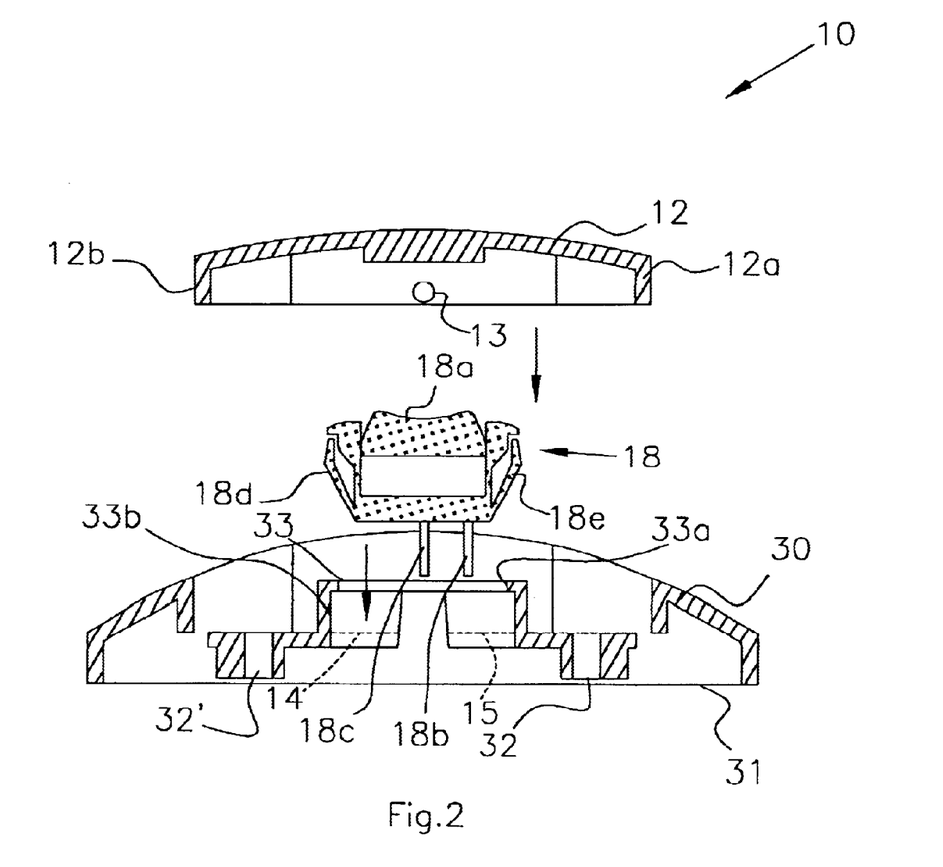
FIG. 2 is an exploded sectioned elevational view of the baseplate components showing their relationship to a toggle switch.
Figure 3:
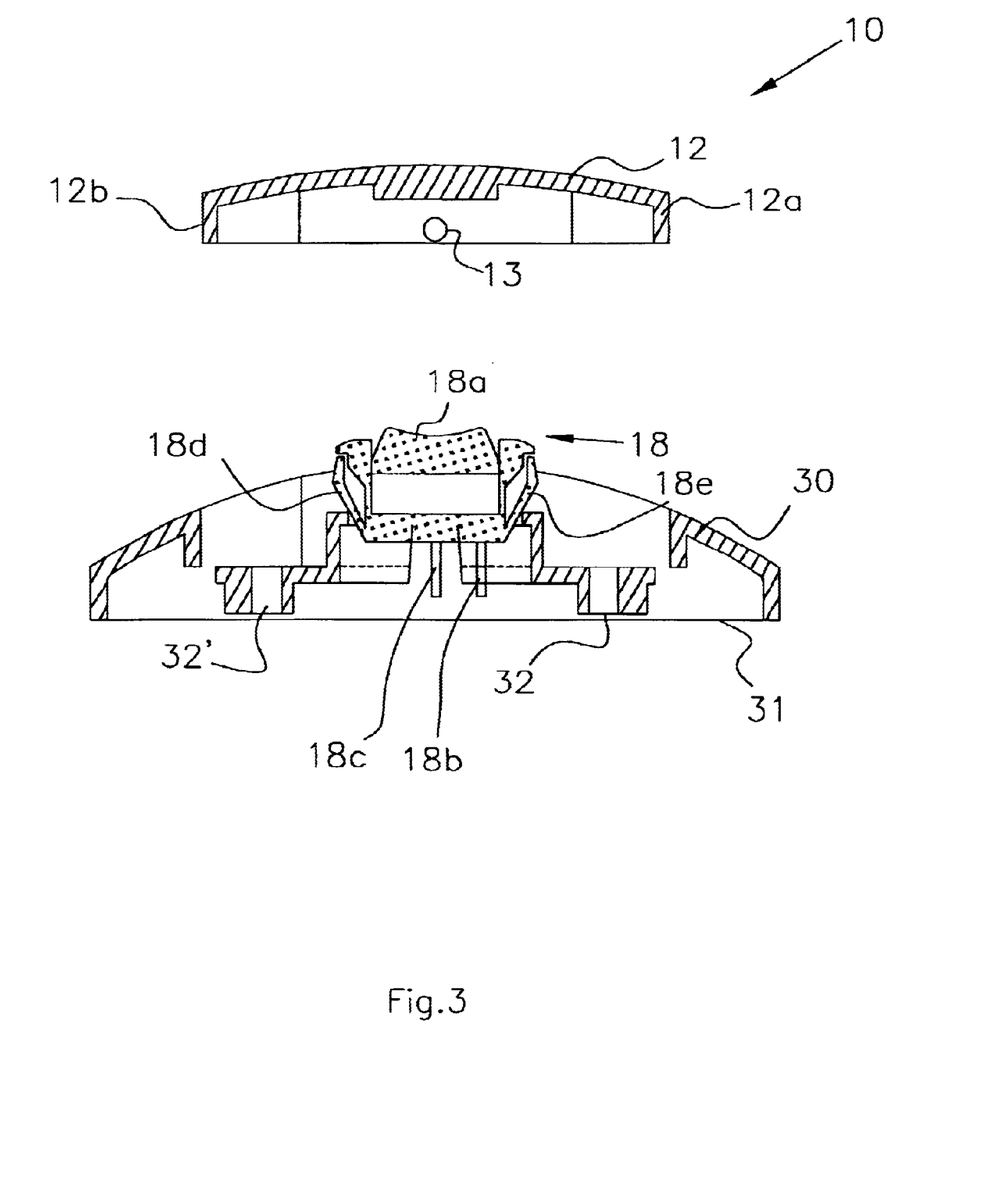
FIG. 3 is a further exploded sectioned elevational view of the baseplate components showing their relationship to a toggle switch as it is inserted into the baseplate body.
Figure 4:
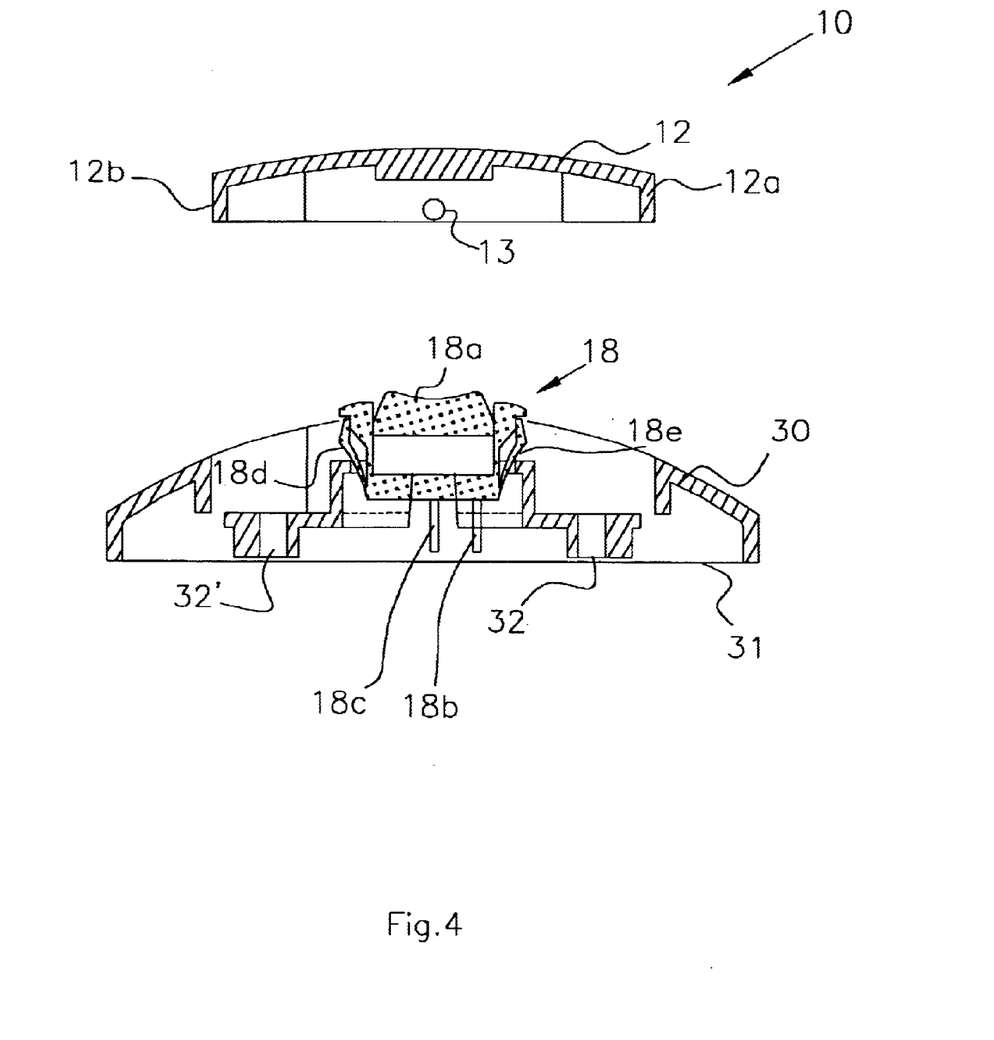
FIG. 4 is a further exploded sectioned elevational view of the baseplate components showing the partial distortion of the toggle switch as it is inserted into the baseplate body.
Figure 5:
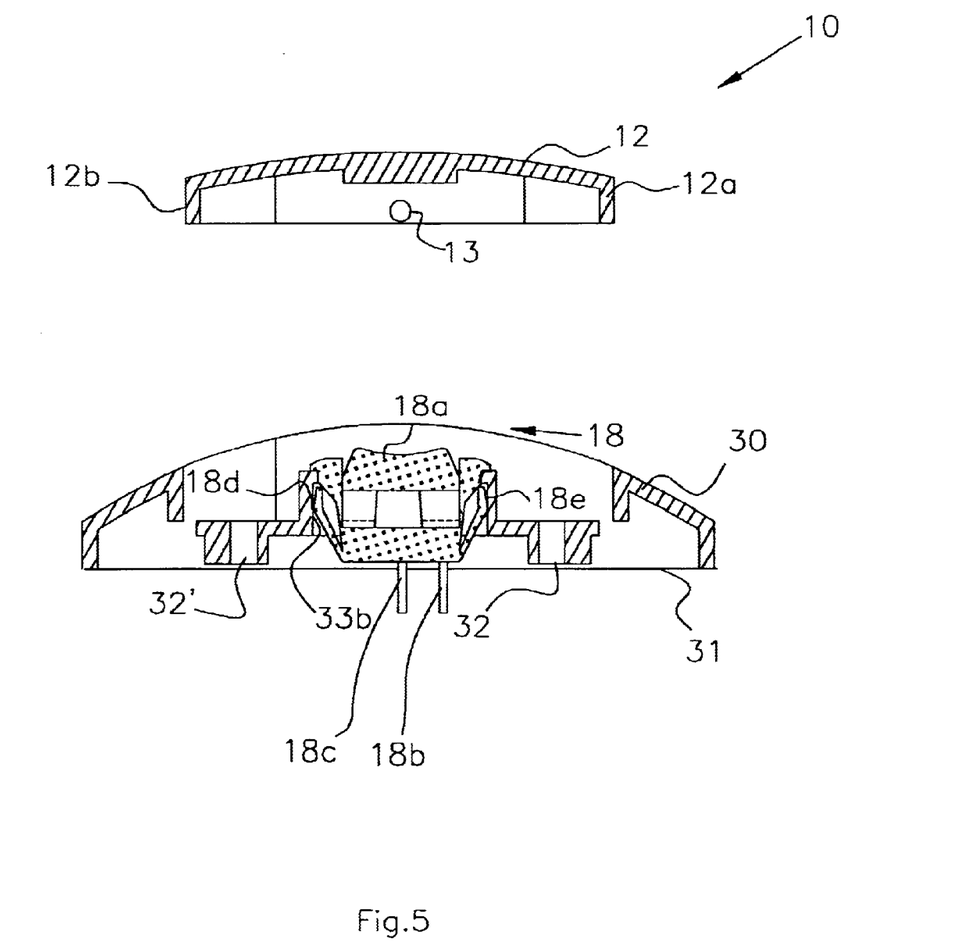
FIG. 5 is a further exploded sectioned elevational view of the baseplate components showing the toggle switch returning to its former shape after it is inserted into the baseplate body.

Referring now to the drawings in which like numerals designate like and corresponding parts throughout the several views and in which the invention is designated overall by the numeral 10. It will be noted that while the present invention is shown as containing a toggle switch which is a version of that described in U.S. Pat. No. 4,128,745 to which earlier reference is made, it will be understood that the principles of the invention are equally applicable to other constructions of switches having a rocker-type activation means. Referring now to FIG. 1, in which cover 12 having a proximal end 12a and a distal end 12b, generally overlies baseplate body 30 and toggle switch assembly 18. Toggle switch terminals 18b and 18c protrude downwardly through aperture 33 in base 30. Screw holes 32 and 32' facilitate the attachment of body 30 to any surface beneath lower face 31.

Figure 6:
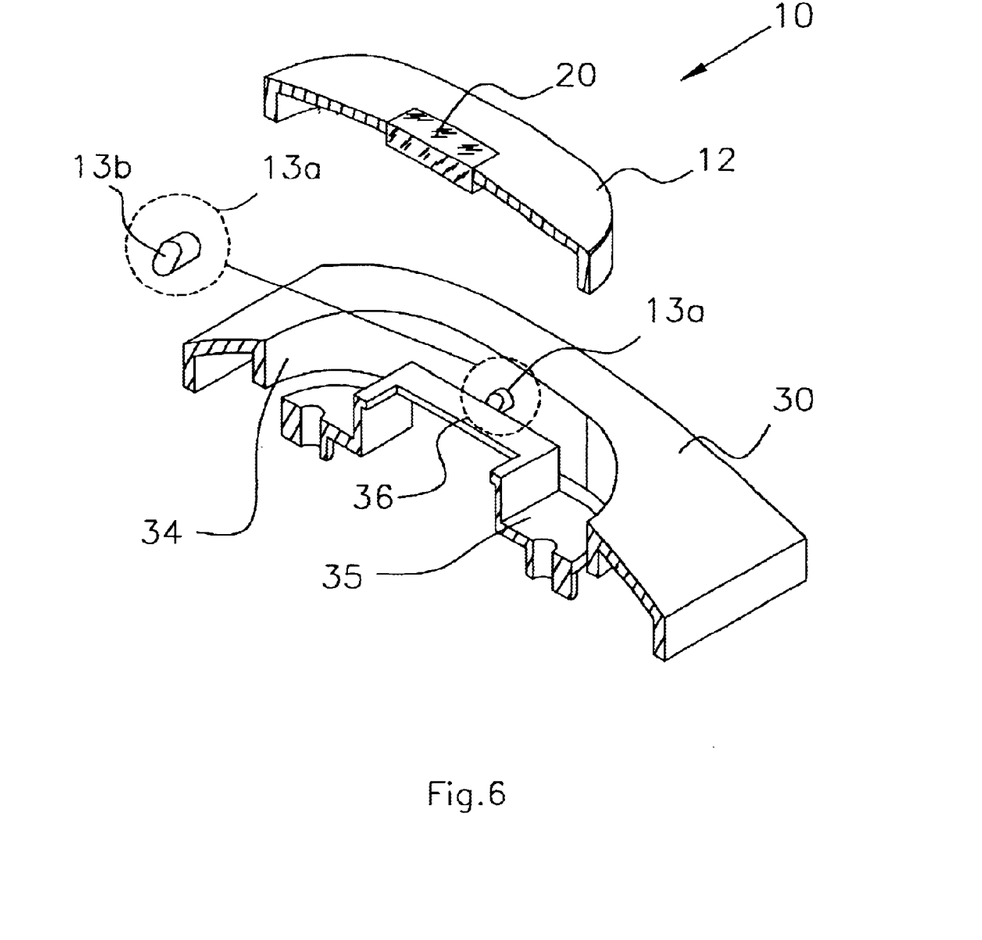
FIG. 6 is an exploded isometric view of the invention showing the baseplate and cover and the pivot and spring mechanisms which permit and restrain, respectively, the oscillation of the cover.

FIG. 6 shows protrusion 13a formed on the inside of depression 34 and the exploded view shows a male pivot shaft 13a having the angle 13b formed on the shaft 13a to facilitate the assembly of cover 12. Also shown is an alternative embodiment having a transparent button 20 in the cover 12. The button 20 will be molded clear and allow light from an illuminated rocker switch assembly 18 to shine through the button 20. The button 20 will be molded to match the color of the cover 12.

Assembly/activation sequences are hereinafter described in FIGS. 2–7 to which reference is now made. Key components of the invention's functionality include, hole 13, which allows the cover 12 to snap in place over male pivot shaft 13a, which is angled downwardly with angle 13b and to thereafter act as a pivot for cover 12 to oscillate with alternate pressure on ends 12a and 12b. Depression 34, raised section 36 and lower section 35 define the base upon which cover portion 12 oscillates and the aperture in which the oscillation occurs. Lower section 35 is connected within the depression 34 to the outer base 30 by extensions 14 and 15.

Figure 7:
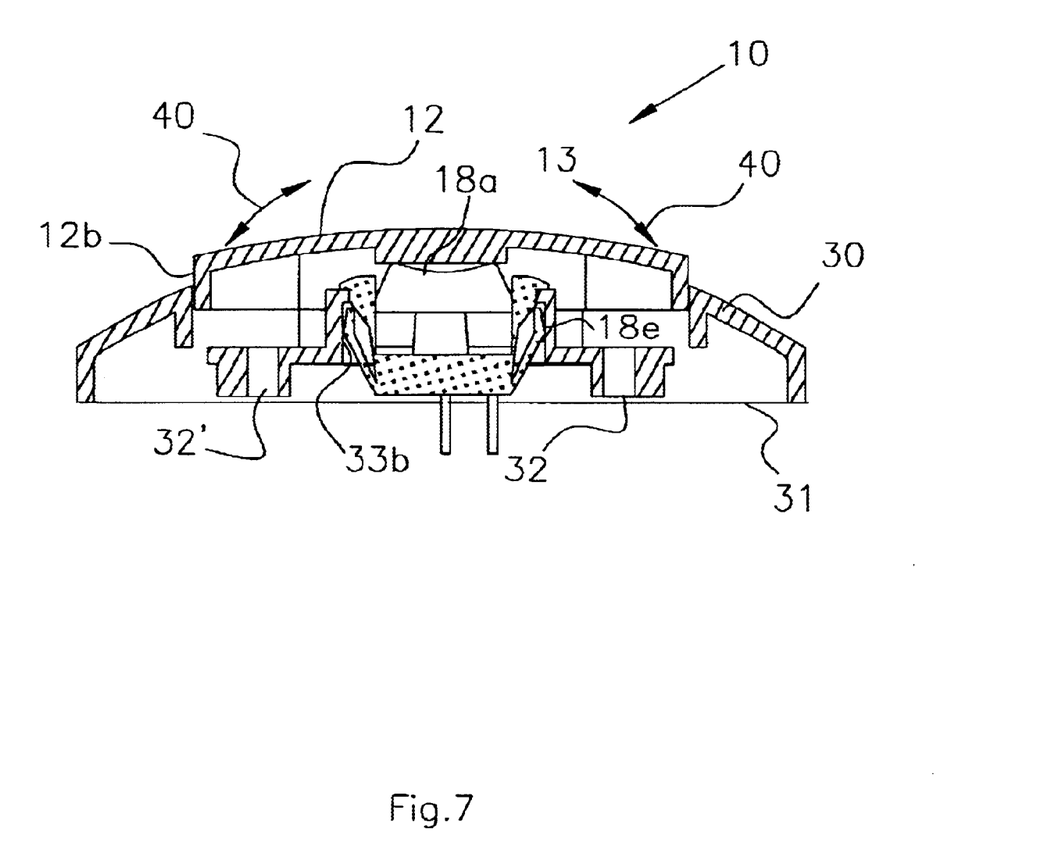
FIG. 7 is an elevational sectioned view of the invention full assembled showing the relative position of each component and illustrating the operation of the cover.

Referring again to FIG. 2, spring means 18c and 18d are about to make contact with faces 33a of aperture 33 as toggle switch assembly 18 is lowered into position. As this lowering is continued, (FIGS. 3, 4) spring means 18d and 18d distort and allow toggle assembly 18 to be inserted into body 30 whereupon springs 18d and 18e return to a semi expanded position which creates an interference with the walls 33b of aperture 33. This holds toggle switch assembly 18 in place. Referring to FIG. 7 in which the pivot assembly is more clearly shown, pivot 13a is shown in position with pivot opening 13 (earlier FIGS.).

Figure 8:
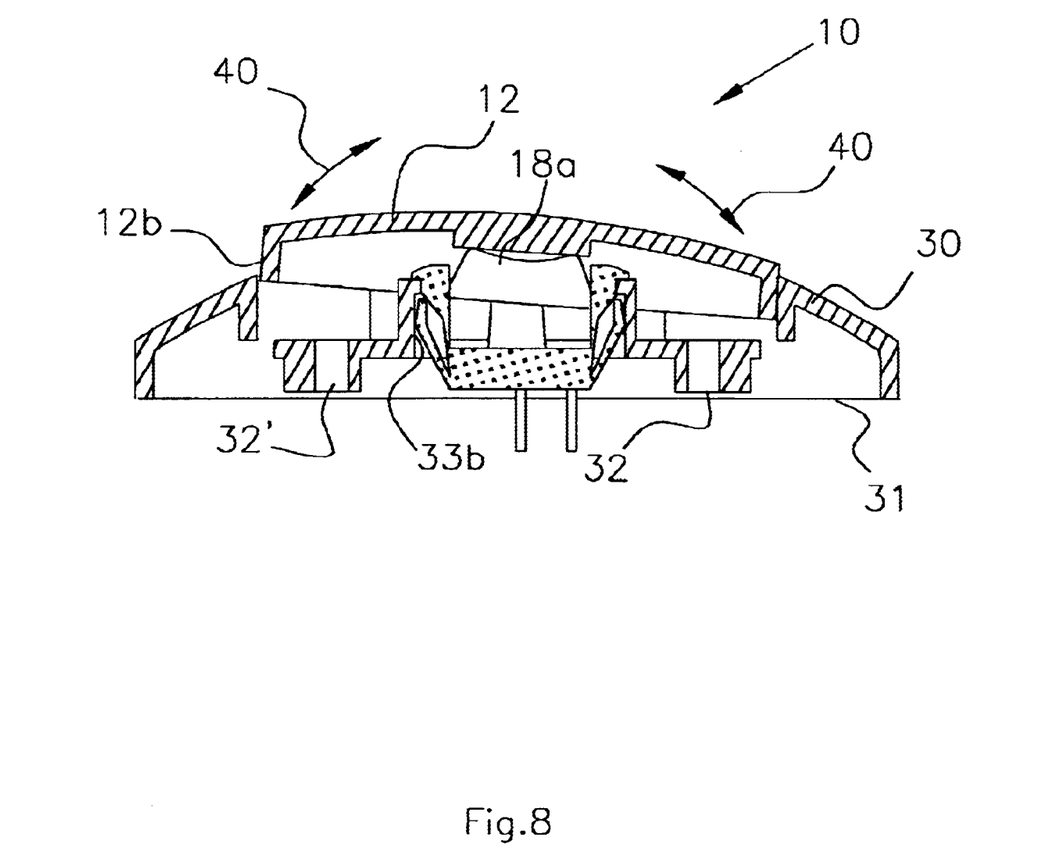
FIG. 8 is an elevational sectioned view of the invention full assembled illustrating the operation of the cover as it is oscillated.

FIG. 7, the invention is assembled and shown in the neutral, "at rest" position ready to be rocked in the direction of arrows 40. In FIG. 8, cover 12 has been rocked toward proximal end 12a by pivoting on pivot opening 13 and, in so doing, moves toggle switch 18a.

Figures 9, 9A:
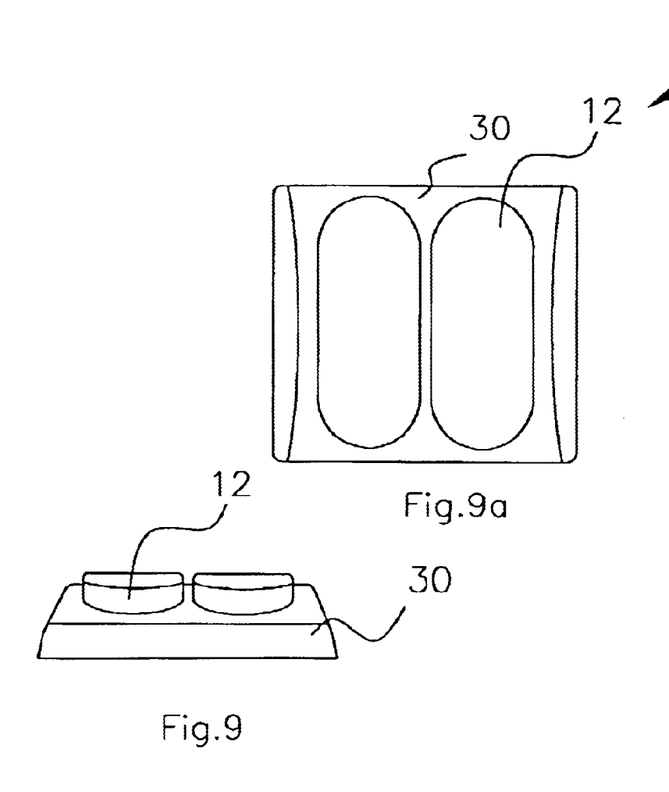
Figure 9B:
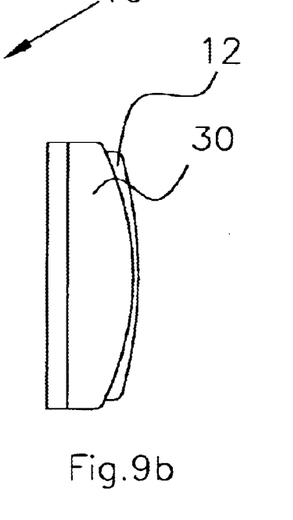
Figure 10:
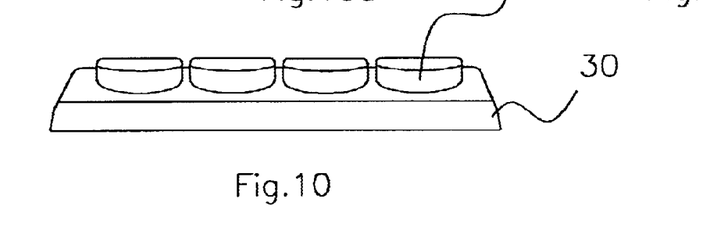
Figures 10A, 10B:
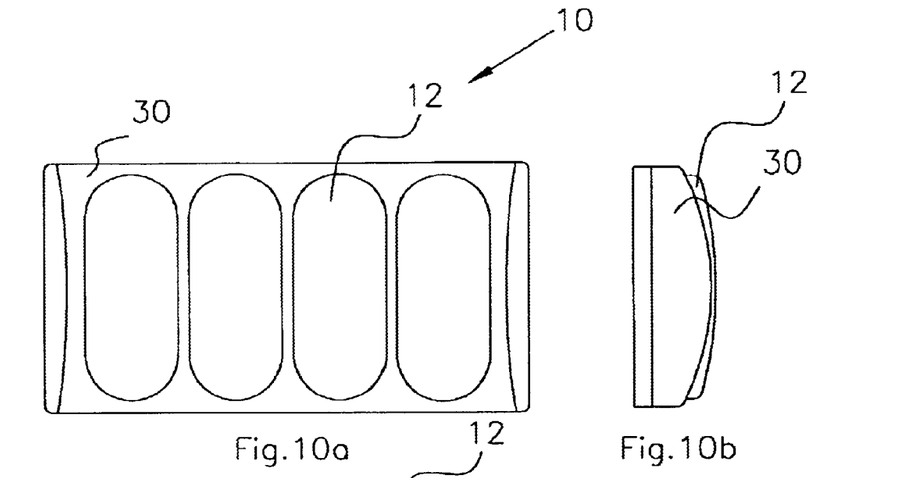

Referring now to FIGS. 9–10b, which show that the invention as described can be configured to accommodate multiple switches and circuits.

It will be understood that the present invention is subject to various changes and modifications which may be made from times to time without departing from the general principles or spirit thereof and that it accordingly intended to claim the same broadly as well as specifically, as indicated by the appended claims.

What is claimed as new and useful is:

1. A combination of a surface mountable base plate housing assembly, and a multi position, rocker toggle switch, said combination comprising:

a base plate body, said base plate body having an oval shaped depression formed therein, said depression having a lower section and a raised section, said lower section having a pair of screw holes, said lower section being connected within said depression to said body by a plurality of extensions, and a pair of male pivot shafts formed on opposite interior sides of said depression and protruding within said depression, said pivot shafts having an angle formed thereon, a generally rectangular aperture formed in said raised section, said aperture being formed centrally in axial alignment to said base and having a pair of faces formed therein, a toggle switch being releasably inserted in said aperture, said toggle switch having a plurality of spring means formed on opposite ends of said toggle switch, said spring means engaging said pair of faces and forming a releasable locking means for said toggle switch, and a cover, generally shaped to fit within said depression and overlaying said toggle switch, said cover having a lower edge, and having a pair of holes on said lower edge, said cover being rotatably mounted on said base, having said pair of holes being mated with and locking onto said male pivot points and said cover contacting said toggle switch, said cover thereby being pivotally attached to said bass and thereby providing a covered switching means for said toggle switch.

2. A combination of a surface mountable base plate housing assembly and a multi position, rocker toggle switch of claim 1 wherein said base plate housing assembly further comprises:

a plurality of said depressions formed therein, a plurality of toggle switches mounted therein, and a plurality of covers being rotatably mounted on said base, over said toggle switches.

3. A combination of a surface mountable base plate housing assembly and a multi position, rocker toggle switch of claim 1, wherein a clear button is formed in said cover, thereby allowing light from an illuminated rocker switch to shine through said button.

\* \* \* \* \*